United States Patent

Blackman

[15] 3,637,956
[45] Jan. 25, 1972

[54] ELECTRICAL AUTOMOBILE TRANSPORTATION SYSTEM

[72] Inventor: Robert D. Blackman, 4242 Hazeltine St., Sherman Oaks, Calif. 91403

[22] Filed: Jan. 27, 1970

[21] Appl. No.: 6,259

[52] U.S. Cl..................................191/4, 174/117.6, 180/2
[51] Int. Cl............................................B60l 9/02, H02j 7/00
[58] Field of Search....................191/4, 3; 180/2; 105/50, 51; 174/117.6; 46/244; 95/1.5

[56] References Cited

UNITED STATES PATENTS

| 894,333   | 7/1908 | Ledwinka  | 191/4     |
|-----------|--------|-----------|-----------|
| 932,707   | 8/1909 | Hunt      | 191/4     |
| 691,473   | 1/1902 | Limb      | 191/4     |
| 840,865   | 1/1907 | Pfatischer| 180/2 X   |
| 1,668,249 | 5/1928 | Rich      | 191/3     |
| 1,859,343 | 5/1932 | Rouge     | 191/4 X   |
| 1,966,318 | 7/1934 | Stephens  | 94/1.5    |
| 3,169,733 | 2/1965 | Barrett, Jr.| 104/153 X |

Primary Examiner—Arthur L. La Point
Assistant Examiner—George H. Libman
Attorney—Robert Louis Finkel

[57] ABSTRACT

An electrically powered automotive transit system including an automotive vehicle having electrical propulsion means and an electrical power system for supplying electrical energy to the vehicle while on the road. The power system embodies exposed electrified conductors on the road and electrical current collectors on the vehicle for contacting the road conductors to effect transmission of electrical energy from the conductors to the vehicle propulsions means. The electrical energy thus supplied to the vehicle may be utilized periodically to charge a battery in the vehicle which powers the vehicle propulsion motor during normal cruising operation continuously or to power the motor directly during cruising operation.

4 Claims, 8 Drawing Figures

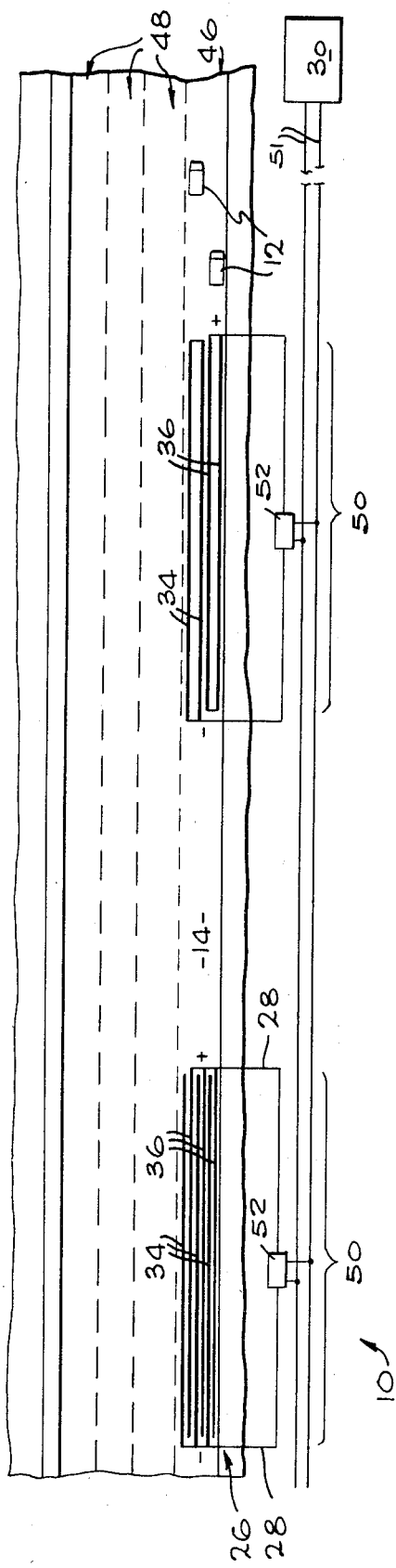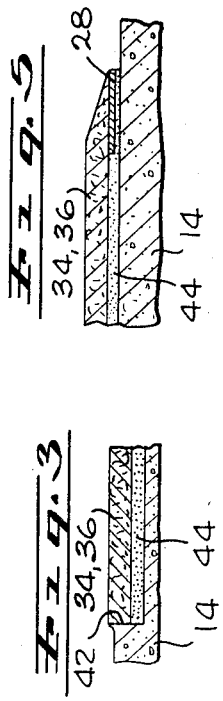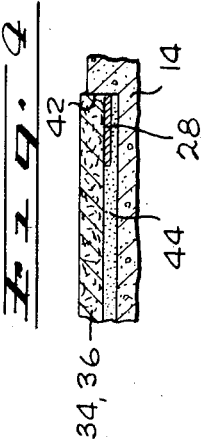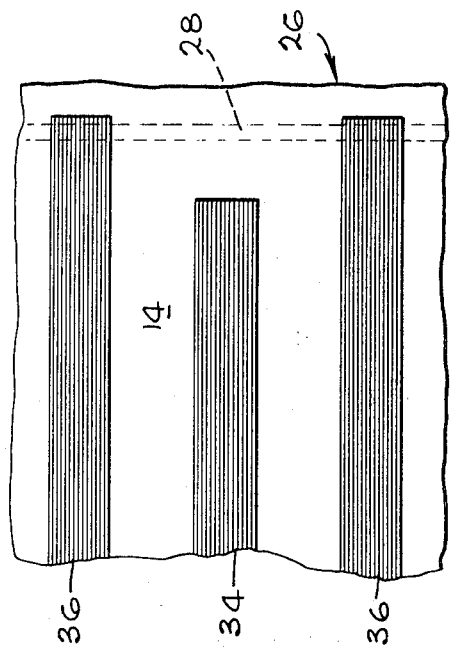

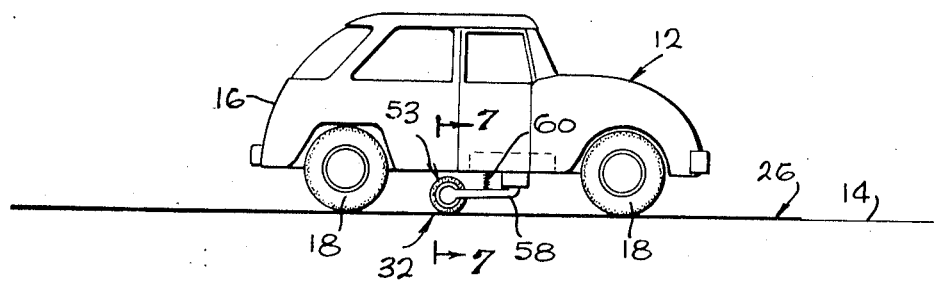
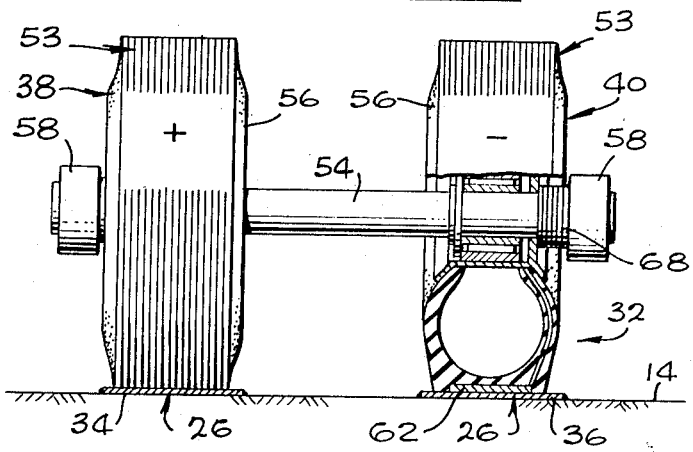
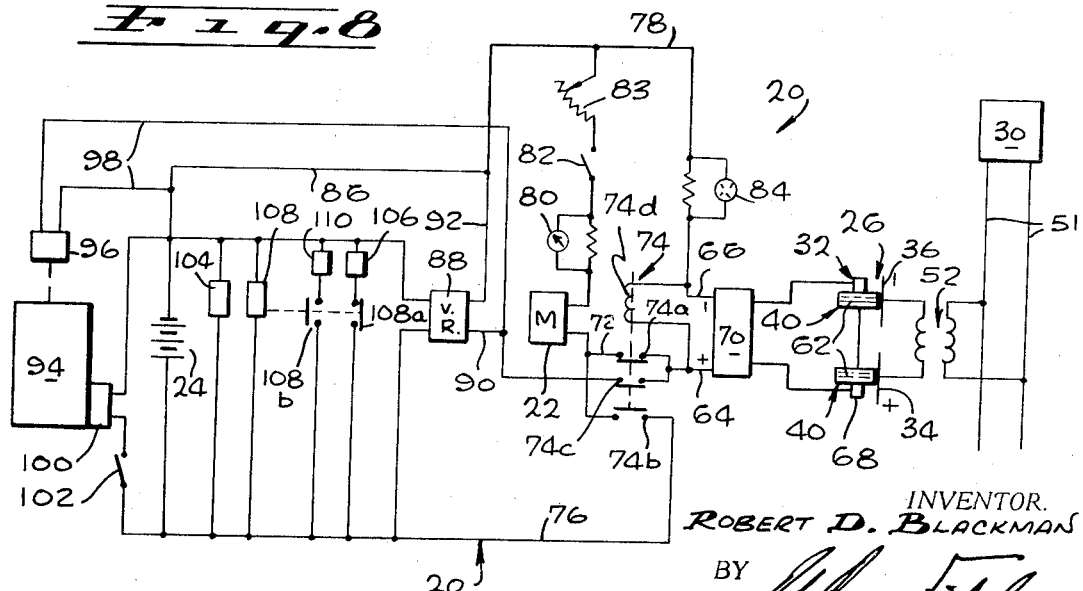

3,637,956

ELECTRICL AUTOMOBILE TRANSPORTATION SYSTEM

BACKGROUND OF THE INVENTION

1. Field of the Invention

This invention relates generally to the field of electrical vehicle propulsion and more particularly to a novel electrically powered automotive transit system.

2. Prior Art

Owing to the present high levels and continuous increase in air pollution in most metropolitan areas of the world, there is an ever increasing demand for an improved propulsion system for automotive vehicles which will significantly reduce or entirely eliminate the exhaust emission associated with operation of conventional fuel powered vehicles. From the standpoint of reduced exhaust emission, one of the best propulsion systems is an electrical propulsion system. However, while it solves the problem of exhaust emission, an electrical propulsion system presents certain inherent problems of its own.

One of the major problems associated with electrical vehicle propulsion involves the electrical power source. Thus, most if not all electrically powered automotive transit systems proposed to date employ automotive vehicles having an electrical propulsion motor powered by a rechargeable electrical storage battery. Much of the current research and development work in the field of electrical automotive vehicle propulsion is aimed at improving this storage battery. However, regardless of the ultimate improvements in rechargeable vehicle propulsion batteries, there will remain the problem of periodically recharging the batteries to replenish the electrical energy consumed during vehicle operation. In this regard, it is significant to note that the battery charging systems which have been proposed up to the present time contemplate wayside recharging stations similar to the present gasoline stations into which a vehicle may be driven to receive a battery charge. These proposed battery charging systems, while they accomplish their intended purpose of battery recharging, suffer from lack of convenience, inefficient vehicle utilization, and other drawbacks. The inconvenience of the recharging systems resides in the necessity of driving a vehicle to and leaving it at the recharging station for the period of time necessary to complete a battery charge. The inefficiency of the proposed recharging systems resides in the fact that the vehicle is removed from serviceable use during recharging.

SUMMARY OF THE INVENTION

The present invention provides an improved electrically powered automotive vehicle transit system which avoids the above noted and other disadvantages of the proposed systems. The subject transit system includes an automotive vehicle having electrical propulsion means and an electrical power feed system for supplying electrical energy to the vehicle while on the road. It is significant to note at the outset that the term "road" is used in a broad generic sense in the present disclosure to encompass surface streets, highways, freeways, and all other avenues of vehicle travel. The power feed system embodies electrified conductors on the road and current collectors on the vehicle for contacting the road conductors to effect transmission of electrical energy from the conductors through the collectors to the vehicle's electrical propulsion means. The electrical energy thus supplied to the vehicle may be utilized to charge a battery in the vehicle which powers the vehicle propulsion motor during normal cruising operation or to power the vehicle propulsion motor directly during cruising operation.

One important aspect of the invention is concerned with attachment of the power feed conductors to an existing road. According to this inventive aspect, the conductors are adhesively bonded to the road, either directly to the road surface or within channels cut into the surface. In the case of a newly constructed road, the conductors may be imbedded directly in the road surface during its construction. Another aspect of the invention involves the arrangement of the conductors on the road, whereby the automotive vehicle may be maneuvered to and from a position wherein the collectors contact the conductors to transmit electrical energy to the vehicle without danger of short circuiting the conductors. According to a further aspect of the invention, the power feed conductors may be located within charging zones arranged at intervals along a road to permit periodic charging of the vehicle battery which powers the vehicle propulsion motor during normal cruising operation. Alternatively, the power feed conductors may extend uninterrupted along the entire length of a road to permit periodic charging of a vehicle propulsion battery or continuous energizing of the vehicle propulsion motor from the road conductors.

Other aspects of the invention are concerned with the electrical propulsion means of the electrically powered automotive vehicle. One feature of the propulsion means, for example, resides in the fact that it switches automatically between its internal or battery powered operating mode and its external or feed system powered mode in response to movement of the vehicle current collectors into and out of electrical contact with the electrified feed conductors in the read. According to another feature, the vehicle propulsion means is equipped with a small auxiliary internal combustion engine which drives a generator for charging the vehicle battery or energizing the electrical vehicle propulsion motor in emergency situations or when external electrical power is unavailable. The automotive vehicle also may be provided with a warning system for signaling a low-battery charge level and cutting out selected nonessential accessories on the vehicle in response to a low-battery charge level.

BRIEF DESCRIPTION OF THE DRAWINGS

FIG. 1 is a plan view of an electrical automotive vehicle transit system embodying the subject invention;

FIG. 2 is a fragmentary enlargement of an electrified battery charging zone of the transit system depicted in FIG. 1;

FIG. 3 is an enlarged fragmentary vertical section through a road conductor of the transit system of FIG. 1;

FIG. 4 is a section taken on line 4—4 in FIG. 3;

FIG. 5 is a view similar to FIG. 3 illustrating an alternative method of installing the road conductors;

FIG. 6 is an enlarged side elevation of an electrically powered automotive vehicle for use in the subject transit system;

FIG. 7 is an enlarged section through the vehicle car collectors taken on line 7–7 in FIG. 6; and FIG. 8 is a schematic circuit diagram of the vehicle propulsion means.

DESCRIPTION OF THE PREFERRED EMBODIMENTS

The drawings illustrate an electrically powered automotive transit system according to the invention including an electrical power feed system 10 for supplying electrical energy to an electrically powered automotive vehicle 12 while on a road 14. Vehicle 12 has a body 16 supported on ground wheels 18, certain of which are driven by an electrical propulsion means 20 embodied in the vehicle. As shown in detail in FIG. 8, this propulsion means includes an electrical propulsion motor 22 and a rechargeable electrical energy storage means or battery 24. As illustrated in FIGS. 6 and 7, the electrical power feed system 10 includes electrified conductor means 26 on the road 14 connected through electrical feeders 28 to an electrical power source 30 and current collector means 32 on the vehicle 12 connected in circuit with the vehicle propulsion means 20. Collector means 32 are arranged for contact with the electrified road conductor means 26 to effect transmission of electrical energy from the power source 30 to the vehicle propulsion means 20 when the vehicle 12 is aligned with the road conductor means. As noted earlier and will appear from the following description, the electrical energy thus supplied to the vehicle may be utilized to charge its battery 24, or to power its propulsion motor 22, or both. The electrical energy may also serve to power various electrical accessories on the vehicle. In the particular inventive embodiment selected for illustration, the vehicle propulsion motor 22 is a direct current motor and the power source 30 is a direct current power source or generator; however, for some applications the invention may well be adapted to utilize alternating current throughout electrical power feed system 10 both to power the vehicle propulsion system and accessories and to charge its storage battery.

The road conductor means 26 comprise at least a pair of electrical conductors 34, 36 which extend along the road 14 in parallel, side-by-side, relation. These conductors are electrically energized from the power source 30 through the feeders 28 in a manner such that conductor 34 has a positive polarity and conductor 36 has a negative polarity. The vehicle current collector means 32 comprise a pair of current collectors 38 and 40 which are spaced laterally of the vehicle 12 a distance approximating the space in between the road conductors 34, 36. The vehicle current collectors are disposed to contact the road conductors when the vehicle 12 is situated over the conductors. Contact of the vehicle current collectors with the road conductors effects transmission of electrical energy from the road power source 30 to the vehicle propulsion means 20.

One important aspect of the invention is concerned with installation of the power feed conductors 34, 36 on the road 14. According to this inventive aspect, the conductors may be installed on an existing road or on a new road at the time of its construction. FIGS. 3 to 5 illustrate two different methods according to the invention for installing the conductors on an existing road. In FIGS. 3 and 4, the conductors are contained within grooves or channels 42 which are cut into the road surface. The conductors protrude slightly above the road surface, as shown. In FIG. 5, the conductors are secured directly to the road surface. Physical attachment of the conductors 34, 36 to the road 14 may be accomplished in various ways. According to the preferred practice of the invention, the conductors are adhesively bonded to the road by a suitable adhesive bonding medium 44, such as that commonly employed to bond lane reflectors and the like to a road. When installing the power feed conductors 34, 36 on a road at the time of its construction, the conductors may be secured to the road in either of the ways described above or by imbedding the conductors directly in the asphaltic or concrete material of the road.

Another important aspect of the invention is concerned with the physical arrangement of the power feed conductors 34, 36 on the road 14. According to this inventive aspect, the conductors may be installed in only one traffic lane in each direction of the road or in several or all traffic lanes of the road, and the conductors may be arranged at intervals along the road or extend the full length of the road, depending upon whether the electrical energy supplied by the power feed system 10 is intended merely to charge the vehicle battery 24 or to continuously power the vehicle propulsion motor 22 during normal cruising operation. Thus, if the power feed system is intended to power the vehicle propulsion motor 22 in normal cruising operation, the power feed conductors 34, 36 may be extended without a break to permit the vehicle to receive electrical energy from the power feed system 10 continuously along the entire length of the road. Appropriate use of intermediate feeders 28 would be taken to prevent disruption of service in the event of a break in the conductors 34, 36 and to maintain current strength at all points along the system. In this case, electrified conductors may be installed in each traffic lane to permit cruising operation of vehicles in any lane.

On the other hand, if the power feed system 10 is intended primarily to supply electrical energy for periodically charging the vehicle propulsion battery 24, the electrified power feed conductors 34, 36 may be installed in only one traffic lane in each direction of the road. Preferably, these electrified traffic lanes are the slow speed lanes or separate battery charging lanes along one side of the regular cruising lanes. In this case, a vehicle will travel in the cruising lanes during normal cruising operation by battery power and will be driven into one of the charging lanes only when it becomes necessary to recharge the vehicle propulsion battery. It should be noted here that the charging lanes may be arranged to permit charging of the vehicle battery while the vehicle is in motion or at rest.

The particular inventive embodiment illustrated in FIG. 1 is a battery charging system wherein the road 14 has one electrified battery charging lane 46 and a number of high-speed cruising lanes 48 in each direction. Each charging lane 46 is provided with a number of battery charging sections or zones 50 arranged at intervals along the lane. Each charging zone 50, in turn, contains at least a pair of electrified power feed conductors 34, 36 extending the length of the zone. The conductors of the several charging zones are connected in parallel to power mains 51 extending to the power source 30. According to the preferred practice of the invention, the road power source 30 is a high-voltage electrical power source, and the road conductors 34, 36 are connected to the power mains 51 through transformers 52 for dropping the voltage to a relatively low level which is not hazardous to persons or animals.

It will now be understood that in the electrically powered automotive transit system of FIG. 1, electrically powered automotive vehicles 12 travel in the cruising lanes 48 during normal high-speed cruising operation. Periodic recharging of the propulsion battery 24 of any vehicle is accomplished by driving the vehicle into one of the battery charging zones 50. In this regard, it will be evident from the earlier description of the road conductors 34, 36 and from the later description of the vehicle current collectors 38, 40 that a vehicle may be freely driven between the cruising lanes and the charging zones. It is of prime significance to note here that installation of the present power feed system 10 on a road in no way interferes with the operation of conventional fuel powered vehicles on the road.

It is possible within the scope of the invention to provide each of the battery charging zones 50 in FIG. 1 with only a single pair of electrified power feed conductors 34, 36. Similarly, if the electrical power feed system 10 is intended to supply electrical energy to a vehicle 12 continuously along the entire length of the road for powering the vehicle propulsion motor 22 during normal cruising operation, as described earlier, the road may be provided with only a single pair of electrified power feed conductors in each direction. According to the preferred practice of the invention, however, a number of conductor pairs are provided in each electrified zone or lane of the road to facilitate contact of the vehicle current collectors 38, 40 with the road conductors and/or to increase the effective width of the electrified lanes so as to permit one vehicle to pass another while driving along an electrified lane.

FIG. 1 illustrates such a multiple conductor pair power feed system. In this case, each charging zone 50 of the road 14 has a number of parallel power feed conductors 34, 36 arranged side-by-side in alternate fashion with a uniform space in between the conductors. The several positive conductors 34 are connected in parallel to one feeder 28 and the intervening negative conductors 36 are connected in parallel to the other feeder 28.

As will appear presently, the vehicle current collectors 38, 40 are spaced to contact any two positive and negative road conductors 34, 36, preferably adjacent conductors, as shown. Also, each current collector has a width less than the space between adjacent road conductors, such that neither current collector of a vehicle can contact two road conductors of opposite polarity simultaneously. Short circuiting of the road conductors by the vehicle current collectors is thereby prevented.

It is evident that when the electrified road conductors 34, 36 are arranged in the illustrated alternate sequence, movement of a vehicle 12 from one side of a charging zone 50 to the other results in periodic reversal of electrical polarity of the vehicle current collectors 38, 40 as the latter pass from one pair to the next pair of adjacent road conductors 34, 36. As explained presently in the detailed description of the vehicle 12, the electrical vehicle propulsion means 20 is preferably equipped with automatic polarity reversing means for automatically reversing the connections between the propulsion means and the current collectors in response to reversal of the collector polarity so as to maintain a constant electrical polarity at the propulsion means. It will be understood, however, that the particular type of motor employed and its associated circuitry are to a great extent matters of choice within the scope of the subject invention.

Turning now to FIGS. 6 through 8 detailing one preferred form of the electrified automotive vehicle 12, the illustrated vehicle current collectors 38, 40 comprise wheels 53 mounted on an axle 54 and having pneumatic tires 56. The wheel axle is supported on its ends in arms 58 which are pivotally attached at their front ends to the underside of the vehicle chassis to form a vertically floating supporting carriage for the collector wheels. Springs 60 acting between the vehicle and the supporting carriage yieldably urge the collector wheels 38, 40 against the road 14. Imbedded in the circumference of each collector wheel tire 56 is an annular conductor 62. The collector wheels 53 may be fixed to the axle 54, in which case the axle will rotate in the wheel carriage arms 58. Preferably, however, the axle is fixed to the arms and the collector wheels rotate independently on the axle to permit relative rotation of the collector wheels during cornering and other vehicle maneuvers.

As noted earlier, and shown in FIG. 7, the collector wheel spacing is the same as the space in between two adjacent positive and negative road conductors 34, 36 to permit the collector wheels to engage the conductors simultaneously. The tread width of each collector wheel conductor 62 is less than the space in between adjacent road conductors to prevent short circuiting contact of a wheel conductor with two adjacent road conductors of opposite polarity.

While the illustrated vehicle has separate current collector wheels 38, 40 it is possible that a pair of the vehicle ground wheels 18 may be utilized as collector wheels.

Referring to FIG. 8, it will be observed that the vehicle collector wheel conductors 62 are electrically connected to the input terminal 64, 66 of the vehicle propulsion means 20 through slip rings 68 and an automatic polarity reversing circuit 70. This polarity reversing circuit is effective to reverse the connections between the wheel conductor 62 and the propulsion means input terminal 64, 66 in response to a change in the electrical polarity at the wheel conductors occasioned by movement of the collector wheels 53 from one set of road conductors 34, 36 to another, thus to maintain a constant polarity at the input terminals. It will be understood, of course, that the collector wheels are suitably electrically insulated from one another.

As noted earlier, the vehicle propulsion means 20 includes an electrical propulsion motor 22 and a rechargeable electrical energy storage means or battery 24. One terminal in the motor 22 is connected to the positive terminals 64 of the propulsion means 20 through a lead 72 containing a set of contacts 74a of a relay 74. This motor terminal is also connected to the positive terminal of battery 24 through a lead 76 containing a set of contacts 74b of the relay. The other motor terminal is connected to the negative input terminal 66 of the vehicle propulsion means 40 to a lead 78 containing, in series, an ameter 80, a main switch 82, a driver operated potentiometer 83, and an indicator light 84. The latter motor terminal is also connected to a negative terminal of the battery 24 through the ameter 80, main switch 82, potentiometer 83, and a lead 86. Also included in the vehicle propulsion means 20 is a voltage regulator 88. One input terminal of this voltage regulator is connected to the positive input terminal 64 of the propulsion means through a lead 90 containing a set of contacts 74c of the relay 74. The other input terminal of the voltage regulator is connected to the negative input terminal 66 of the vehicle propulsion means through a lead 92 and the indicator light 84. The output terminals of the voltage regulator are connected to the terminals of battery 24.

Relay 74 has a coil 74d connected across the input terminals 64, 66 of the vehicle propulsion means 20. Accordingly, the relay is energized when the vehicle current collector wheels 38, 40 engage the electrified road conductors 34, 36. Relay contacts 74a, 74c are normally open contacts which close, and relay contacts 74b are normally closed contacts which open, when the relay is thus energized. Since FIG. 8 illustrates the collector wheels in contact with the electrified road conducts, the relay is shown in its energized state.

From the description to this point of the vehicle propulsion means 20, it will be understood that when the relay 74 is energized from the electrified road conducts 34, 36 through the vehicle current collector wheels 38, 40 with the main motor switch 82 closed, the vehicle propulsion motor 22 and the voltage regulator 88 are connected in electrical parallel to and must receive electrical energy from the road conductors through the collector wheels. The electrical energy thus supplied to the vehicle charges its battery 24 through the voltage regulator 88 and simultaneously powers its propulsion motor 22 to permit driving of the vehicle during the battery charge. Vehicle speed is controlled by the potentiometer 83. If the motor switch 82 is open, the electrical energy supplied to the vehicle only charges the vehicle battery. During operation of the vehicle in this externally powered mode, the ameter 80 registers a current flow to the motor and the indicator lamp 84 is illuminated to indicate the vehicle is operating in its externally powered mode.

When the relay 74 is deenergized, owing to lack of contact of the vehicle collector wheels 38, 40 with the electrified road conductors 34, 36, or failure of the external power feed system 10, the relay contacts 74a, 74c open to interrupt the electrical circuit between the motor and voltage regulator and the vehicle collector wheels 38, 40. The relay contacts 74b close to complete an energizing circuit between the motor and the vehicle propulsion battery 24. Under these conditions, the vehicle operates in its internally powered mode, wherein the vehicle motor 22 is powered by the vehicle battery 24.

According to the preferred practice of the invention, vehicle 12 is equipped with a small auxiliary internal combustion engine 94 driving an electrical generator 96 for charging the battery 24 in situations wherein no external power is available. To this end, the generator output is connected through leads 98 to the voltage regulator 88. Engine 94 has a starter 100 and an ignition system (not shown) connected across the battery 24 through an ignition switch 102. While the illustrated auxiliary engine and generator are designed merely to charge the vehicle battery 24 in emergency situations, it is possible that the engine and generator may be sized to power the electrical vehicle propulsion motor 22 directly, in emergency situations.

According to a further preferred practice of the invention, the accessory equipment of the vehicle 12, such as lights, radio, horn, etc., is divided into an essential accessory group 104 and a nonessential accessory group 106. The essential accessory group includes those vehicle accessories which are required for safe vehicle operation. The nonessential accessory includes those accessories, such as a radio, heater, which are not required for safe vehicle operation. The essential accessory group 104 is connected to the vehicle battery 24 in a conventional manner. The nonessential accessory group is connected to the battery through contacts 108a of a low-voltage detection relay 108. This relay is connected across the battery and operates to maintain its contacts 108a closed, for activating the nonessential accessory group 106, so long as the battery charge remains above a safe level. If the battery charge drops below this safe level, the relay contacts 108a open to inactivate the nonessential accessory group 108 so as to conserve the remaining battery power. If desired, the low-voltage detection relay 108 may be provided with a second set of contacts 108b which close to energize a visual and/or audible alarm 110 when the battery charge drops below the safe level.

The operation of the illustrated electrically powered automotive transit system is now evident. Thus, the automotive vehicle 12 may be driven under battery power along one of the cruising lanes 48 of the road 14 until the charge of the vehicle battery 24 drops to an unsafe level. The battery may then be charged by driving the vehicle into one of the charging zones 46 and maneuvering it to engage its current collector wheels 38, 40 with the electrified road conductors 34, 36 within successive charging zones. The charging zones 50 are preferably spaced along the road 14 on the order of a mile or so apart so that failure of one zone will not prevent the vehicle from reaching the next electrified charging zone. In this latter regard, it is significant to note that a block-type charging system of the kind shown is preferred to a single continuous conductor system, since failure of one electrified block or charging zone 50 will not inactivate the entire charging system. However, as noted earlier, a transit system according to the invention may employ electrically powered automotive vehicles which are powered continuously from the electrified road conductors during normal cruising operation of the vehicles. In this case, obviously, it is necessary that the conductors extend the full length of the road.

What is claimed is:

1. An electrically powered automotive transit system comprising:
    a road having a substantially smooth surface,
    a steerable electrically powered wheeled motor vehicle including electrical propulsion means for propelling said vehicle, said vehicle being operable on and off said road,
    electrical conductor means extending a fixed distance along said road, including plural pairs of parallel, uniformly spaced road conductors adhesively secured to the road within charging zones arranged at intervals along said road, the profile of said conductors being such as to permit the unimpeded passage of the wheels of said vehicle laterally across said conductors, and a pair of electrical feeders transmitting electrical energy from an electrical power source to two sets of alternate conductors, and
    a pair of current collectors associated with said vehicle and connected in electrical circuit with said vehicle propulsion means, the width of each of said current collectors being less than the space between adjacent ones of said road conductors, whereby neither collector can contact both said conductors simultaneously,
    said current collectors being spaced laterally of said vehicle to contact one conductor of one of said conductor sets and one conductor of the remaining conductor set when said vehicle is aligned with said conductors,
    said vehicle propulsion means including an electrical propulsion motor, a rechargeable storage battery energizing said motor, and means connecting said battery to said current collectors whereby said battery receives charging current from said road conductors when said current collectors are in electrical contact therewith.

2. An automotive transit system as defined by claim 22 wherein:
    said vehicle propulsion means comprises relay means for connecting said motor and battery in parallel with said current collectors in response to contact of said current collectors with the electrified road conductors and connecting said battery and motor to one another in response to movement of said current collectors out of contact with said electrified road conductors.

3. An automotive transit system as defined in claim 1 wherein said road conductors are thin conductive strips adhesively retained in channels provided in the road, the exposed surfaces of said strips being substantially level with the surface of the road.

4. An automotive transit system as defined by claim 2 wherein said road conductors are thin conductive strips adhesively retained in channels provided in the road, the exposed surfaces of said strips being substantially level with the surface of the road.

* * * * *

PO-1050
(5/69)

UNITED STATES PATENT OFFICE
CERTIFICATE OF CORRECTION

Patent No. 3,637,956      Dated 25 January 1972

Inventor(s) ROBERT D. BLACKMAN

It is certified that error appears in the above-identified patent and that said Letters Patent are hereby corrected as shown below:

Column 8, line 16, change "22" to --1--.

Signed and sealed this 3rd day of October 1972.

(SEAL)
Attest:

EDWARD M. FLETCHER, JR.
Attesting Officer

ROBERT GOTTSCHALK
Commissioner of Patents